(No Model.)
A. W. STILES.
GARDEN IMPLEMENT.
No. 423,640. Patented Mar. 18, 1890.
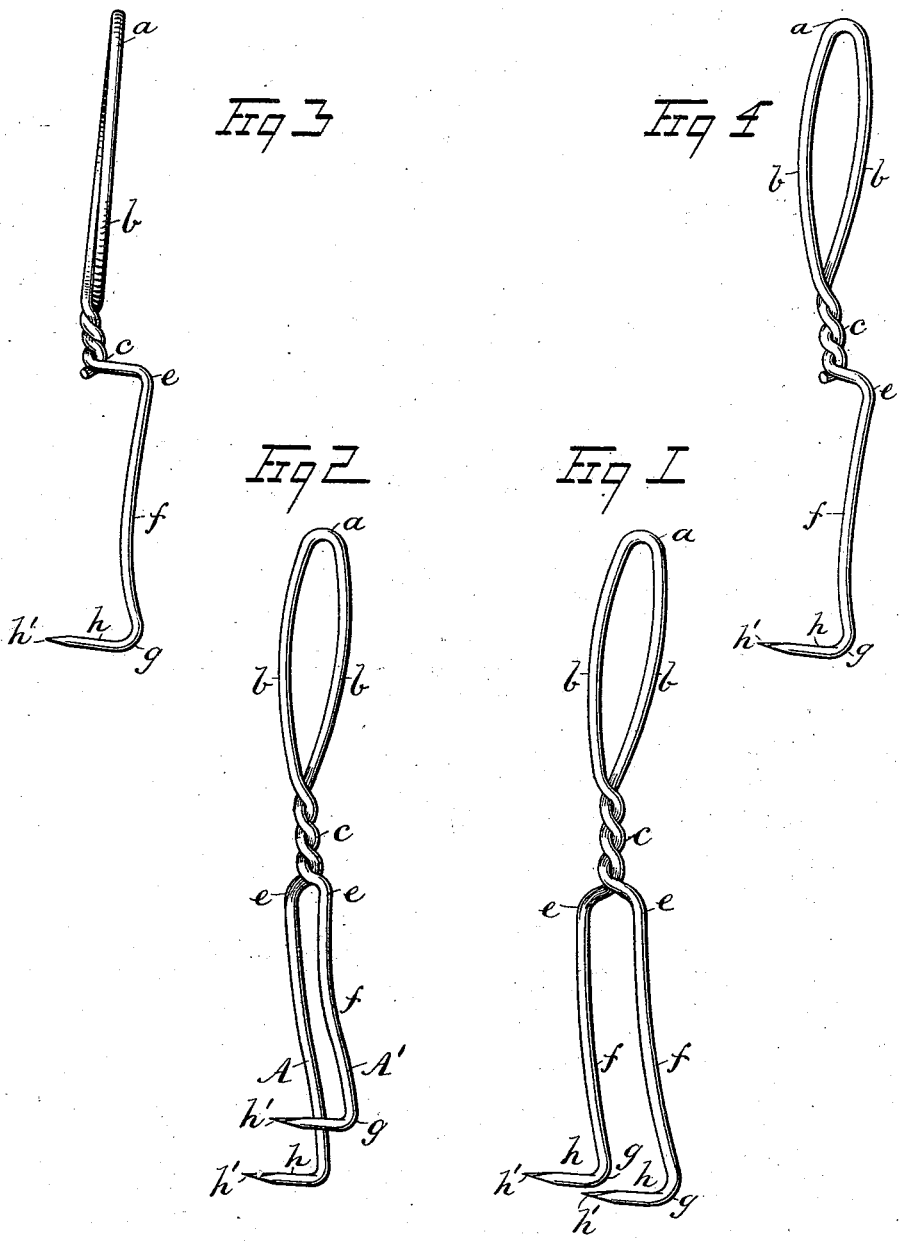
WITNESSES:
H. Walker
C. Sedgwick
INVENTOR:
A. W. Stiles
BY
Munn & Co.
ATTORNEYS.

UNITED STATES PATENT OFFICE.

ALBERT W. STILES, OF ROCK CREEK, OHIO.

GARDEN IMPLEMENT.

SPECIFICATION forming part of Letters Patent No. 423,640, dated March 18, 1890.

Application filed September 10, 1889. Serial No. 323,552. (No model.)

*To all whom it may concern:*

Be it known that I, ALBERT W. STILES, of Rock Creek, in the county of Ashtabula and State of Ohio, have invented new and useful Improvements in Garden Implements, of which the following is a full, clear, and exact description.

My invention relates to an improvement in garden implements, the object being to provide a simple, cheap, and convenient tool, which will facilitate the removal of weeds from growing plants and also loosen the soil near their roots.

With this object in view my invention consists in the peculiar construction of the device from a single piece of wire rod, as hereinafter described and claimed.

Reference is to be had to the accompanying drawings, forming a part of this specification, in which similar letters of reference indicate corresponding parts in all the figures.

Figure 1 is a perspective view of a preferred form for the tool. Fig. 2 is a perspective view of the implement under a slightly-modified construction. Fig. 3 shows an edge view of a modified form of the implement, and Fig. 4 is a perspective view of the implement illustrated in Fig. 3.

The removal of weeds from onions, beets, carrots, and other vegetables grown in beds close together, as ordinarily done by the fingers of the operator, is slow and laborious work. If a hoe is used, there is danger of uprooting or cutting off the plants. The implement herein presented can be used rapidly and safely to remove weeds and cultivate the soil around and near to the roots of growing plants, either potted or in beds.

Referring to Fig. 1 of the drawings, it will be seen that a wire rod of proper size and length is bent at $a$, which represents the center of length of the piece of metal. The two portions are curved slightly outward, so as to provide a convenient handle $b$, and at $c$ the two strands are wrapped around each other in a manner to produce a twisted shank, which affords stability to the handle portion. At $e$ the two pieces of wire are bent outward and downward, producing two limbs $f$, which are substantially parallel, and are both curved slightly from the rear forward near their center of length, so as to present the hooked lower ends $h$ that are bent forwardly at $g$ at a proper angle to the soil when the tool is in use. The terminal ends $h'$ of the bent hooked portions $h$ are both flattened, so as to produce chisel-shaped edges that lie in the same plane, in effect forming small hoes.

In Fig. 2 the device presented is substantially like the preferred form shown in Fig. 1, with exception that one limb $A'$ is shorter than the limb $A$. This form of construction adapts the tool for special uses, such as weeding about plants in hills, where the soil need not be worked so deep close to the plants.

In Figs. 3 and 4 a tool is shown which has a single limb. The implement is otherwise made substantially the same as those previously described. This form of construction affords a very convenient tool to remove grass from the interstices in brick walls or pavements.

Having thus described my invention, what I claim as new, and desire to secure by Letters Patent, is—

1. A garden-tool bent from a single piece of wire rod, having an ovate handle, a shank twisted below the handle portion, and a hook-shaped limb provided with a chisel edge, substantially as set forth.

2. A garden-tool bent from a single piece of wire rod, having an ovate handle formed by bending the material to produce an ellipse and afterward twisting the two strands together, and further provided with two limbs that are substantially parallel and have hook-shaped ends, which are each sharpened to a cutting-edge by flattening the terminal ends in the same plane, substantially as set forth.

ALBERT W. STILES.

Witnesses:
NELLIE F. PRATT,
MAUD STILES.